(12) United States Patent
Kasai et al.

(10) Patent No.: US 6,696,130 B1
(45) Date of Patent: Feb. 24, 2004

(54) CERAMIC HONEYCOMB STRUCTURE AND PROCESS FOR PRODUCTION THEREOF

(75) Inventors: Yoshiyuki Kasai, Kasugai (JP); Takashi Harada, Nagoya (JP); Yukinari Shibagaki, Nagoya (JP); Akito Higuchi, Kani (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/534,491

(22) Filed: Mar. 24, 2000

(30) Foreign Application Priority Data

Mar. 31, 1999 (JP) .......................... 11-092898

(51) Int. Cl.⁷ ................................. B32B 3/12
(52) U.S. Cl. .................. 428/116; 428/34.5; 428/304.4; 428/312.2; 422/180; 422/177; 422/168; 264/630; 264/631; 264/629; 264/628; 264/632; 264/634; 264/638; 264/669
(58) Field of Search ................ 428/116, 34.5, 428/117, 118, 304.4, 312.2; 422/180, 177, 168; 264/630, 631, 669, 638, 632, 634, 629, 628

(56) References Cited

U.S. PATENT DOCUMENTS

| 3,954,672 | A | * | 5/1976 | Somers et al. |
| 4,001,028 | A | | 1/1977 | Frost et al. |
| 4,235,855 | A | | 11/1980 | Cleveland |
| 4,276,071 | A | * | 6/1981 | Outland |
| 4,280,845 | A | | 7/1981 | Matsuhisa et al. |
| 4,300,953 | A | | 11/1981 | Lachman |
| 4,476,236 | A | | 10/1984 | Inoguchi et al. |
| 4,722,916 | A | | 2/1988 | Watanabe et al. |
| 4,877,670 | A | * | 10/1989 | Hamanaka |
| 5,966,582 | A | * | 10/1999 | Chalasani et al. |

FOREIGN PATENT DOCUMENTS

| EP | 0 506 301 | 3/1992 |
| EP | 0 894 776 | 7/1998 |

* cited by examiner

Primary Examiner—Deborah Jones
Assistant Examiner—Wendy Boss
(74) Attorney, Agent, or Firm—Parkhurst & Wendel, L.L.P.

(57) ABSTRACT

A ceramic honeycomb structure has an open frontal area of 50% to 85%, a porosity of 0.1% to 10%, and a proportion of the volume of pores of 1 $\mu$m or larger in diameter, in total pore volume, of 20% or more; a regenerative thermal oxidizer using the ceramic honeycomb structure. The ceramic honeycomb structure has a small porosity and, therefore, has a sufficient heat accumulation capacity and hardly causes floating by gas pressure; has controlled pore diameters and, therefore, hardly shows adsorption of VOC or the like, or rupture; and has controlled contraction and, therefore, has a large GSA.

14 Claims, 1 Drawing Sheet

PRIOR ART

US 6,696,130 B1

CERAMIC HONEYCOMB STRUCTURE AND PROCESS FOR PRODUCTION THEREOF

BACKGROUND OF THE INVENTION (1) Field of the Invention

The present invention relates to a ceramic honeycomb structure used as a heat accumulator, etc.; a regenerative thermal oxidizer using the ceramic honeycomb structure; and a process for producing the ceramic honeycomb structure.

(2) Description of Related Art

In recent years, there has been a problem that the volatile organic compounds (hereinafter referred to as VOC) and unburnt gas contained in the exhaust gases from plants, etc. incur forest exhaustion by acid rain or injure the health of people living in the neighborhood of the plants, etc. In order to remove such VOC and unburnt gas by combustion, regenerative thermal oxidizer (hereinafter referred to as RTO), regenerative catalytic oxidizer (hereinafter referred to as RCO), etc. are in use. Incidentally, removal of the VOC and unburnt gas in exhaust gas from plant is generally called "deodorization", and a gas containing VOC and unburnt gas, before deodorization is herein referred to as "pre-deodorization gas".

RTO or RCO has therein a heat-accumulating unit which can conduct heat exchange with a gas. In RTO or RCO, therefore, the heat generated by combustion of VOC and unburnt gas is utilized for heating of the next (fresh) pre-deodorization gas, which enables (1) reduction in deodorization cost, (2) energy saving and (3) reduction in global warming speed, resulting from release of smaller amount of combustion heat.

In FIG. 1 is shown a three-chamber type RTO which is the most ordinarily used RTO. In FIG. 1, a three-chamber type RTO 1 has three heat exchange chambers 2a, 2b and 2c; and each of the heat exchange chambers 2a, 2b and 2c communicate with a single combustion chamber at the top. Each heat exchange chamber 2 has, at the bottom, a gas-feeding pipe 4 and a gas-discharging pipe 5. In each heat exchange chamber 2 is provided a heat-accumulating unit 7 constituted by a honeycomb structure. At the ceiling of the combustion chamber 3 is provided a burner 6.

In the three-chamber type RTO 1, having the above constitution, a pre-deodorization gas is fed into either one of the three heat exchange chambers 2a, 2b and 2c via the gas-feeding pipe 4, and passes through the heat-accumulating unit 7 of the heat exchange chamber, and enters the combustion chamber 3. At this time, heat exchange occurs between the pre-deodorization gas and the heat-accumulating unit 7, whereby the pre-deodorization gas is heated to near the combustion temperature. In the combustion chamber 3, the VOC and unburnt gas in pre-deodorization gas are burnt by the burner 6. The gas after deodorization (hereafter referred to as "post-deodorization gas") passes through the other two heat exchange chambers 2 and are released into air via the gas-discharging pipe 5. At this time, the heat generated by combustion of VOC and unburnt gas is partly adsorbed by the heat-accumulating units 7 of the other two heat exchange chambers 2. The heat exchange chamber 2 into which the pre-deodorization gas is fed and the other two heat exchange chambers 2 which discharge the post-deodorization gas, are switched at given intervals, and the above operation is conducted continuously, whereby the heat generated by combustion of pre-deodorization gas is used to heat the next (fresh) pre-deodorization gas. In the case of RCO, a catalyst is supported on the top of each heat-accumulating unit 7, whereby the activation energy necessary for the combustion of VOC and unburnt gas is lowered and the deodorization cost is reduced further.

As the above-mentioned heat-accumulating unit of RTO and RCO, a honeycomb structure is used. It is because the honeycomb structure has a large surface area per unit volume and accordingly is superior in heat exchange property, can give a small RTO and can give a small pressure loss. Incidentally, "honeycomb structure" refers to, for example, a structure 13 shown in FIG. 2, wherein a large number of cells 11 are surrounded by partition walls 12. Since the structure 13 has a large contact area with a gas fed from a plurality of cell openings at the one end, the heat exchange between the honeycomb structure 13 and the gas is conducted efficiently. As the material of the honeycomb structure 13 constituting the heat-accumulating unit, there is generally used a ceramic superior in heat exchange property. Ordinarily, a honeycomb structure similar to that used as a carrier for catalyst for automobile exhaust gas purification is used as the heat-accumulating unit of RTO.

The honeycomb structure used as a carrier for catalyst for automobile exhaust gas purification is highly porous in many cases in order to maximize the amount of catalyst loaded thereon; therefore, when it is used as the heat-accumulating unit of RTO, there have been problems such as (1) low heat exchangeability due to insufficient heat accumulation capacity and (2) adsorption of VOC and unburnt gas inside pores and resultant release of pre-deodorization gas into air. There has also been a problem that the small bulk specific gravity of honeycomb structure gives rise to floating of honeycomb structure in heat exchange chamber by pressure of pre-deodorization gas, inviting reduction in heat exchange efficiency.

To alleviate such problems, it is considered to use, as the heat-accumulating unit of RTO, a porcelain of low porosity. In this technique, however, there has generally been a problem that use of a porcelain of small cell pitch to increase its geometrical surface area (hereinafter referred to as GSA) and accordingly increase its heat exchange area, makes large the contraction during firing and causes cracking easily.

SUMMARY OF THE INVENTION

In view of the above situation, the present invention aims at providing a ceramic honeycomb structure which has a sufficient heat accumulation capacity, which hardly causes adsorption of VOC, etc. or floating due to the pressure of gas, which is resistant to rupture, and which has a large GSA; a RTO using the honeycomb structure; and a process for producing the honeycomb structure.

According to the present invention, there is provided a ceramic honeycomb structure having an open frontal area of 50% to 85%, a porosity of 0.1% to 10%, and a proportion of the volume of pores of 1 $\mu$m or larger in diameter, in total pore volume, of 20% or more.

The ceramic honeycomb structure of the present invention preferably has a thermal expansion coefficient of $3.0 \times 10^{-8}/°$C. or less in the flow direction of cell, an average pore diameter of 0.01 $\mu$m or more, a partition wall thickness of 100 $\mu$m to 800 $\mu$m, and a geometrical surface area of 0.8 $mm^2/mm^3$ or more. In the ceramic honeycomb structure of the present invention, the porosity is preferably 7.5% or less and the main crystalline phase is preferably made of cordierite. The ceramic honeycomb structure of the present invention may be a heat accumulator.

According to the present invention, there is further provided a regenerative thermal oxidizer (RTO) or regenerative catalytic oxidizer (RCO) using a plurality of the above ceramic honeycomb structures.

According to the present invention, there is furthermore provided a process for producing the above ceramic honeycomb structure, which comprises adding at least a molding aid and a solvent to a raw material mixture comprising a ceramic material and a ceramic precursor material, kneading the resulting mixture to obtain a molding material, extruding the molding material into a honeycomb-shaped material, and drying and firing the honeycomb-shaped material, wherein the proportion of the ceramic material in the raw material mixture is 50 to 95% by weight, the average particle diameters of the ceramic material and the ceramic precursor material are each in a range of 3 to 25 μm, the average particle diameter of the raw material mixture is in a range of 5 to 20 μm, and when the average particle diameter of the ceramic material is Da and the average particle diameter of the ceramic precursor material is Db, Da is in a range of 3 μm to less than 5 μm, and Da and Db satisfy Da≦0.6×Db, or Db is in a range of 3 μm to less than 5 μm, and Da and Db satisfy Db≦0.6×Da, or Da and Db are each in a range of 5 μm to 15 μm, or Da is in a range of 15 μm to less than 25 μm, and Da and Db satisfy 0.6×Da≧Db, or Db is in a range of 15 μm to less than 25 μm, and Da and Db satisfy 0.6×Db≧Da.

In the production process of the present invention, the proportion of the ceramic material in the raw material mixture is preferably 75 to 95% by weight. In the production process of the present invention, each of the ceramic material and the ceramic precursor material may consist of first particles having an average particle diameter of 15 μm to less than 25 μm and second particles having an average particle diameter of 60% or less of that of the first particles, and the proportion of the second particles in each material may be 5% by weight to less than 50% by weight.

Also in the production process of the present invention, at least part of the surfaces of the particles constituting the ceramic precursor material may be coated with a molding aid or a solvent, and the ceramic material may be a material obtained by firing the ceramic precursor material. In this case, the main crystalline phase of the ceramic material is preferably made of cordierite.

DESCRIPTION OF PREFERRED EMBODIMENTS

Figure 1:
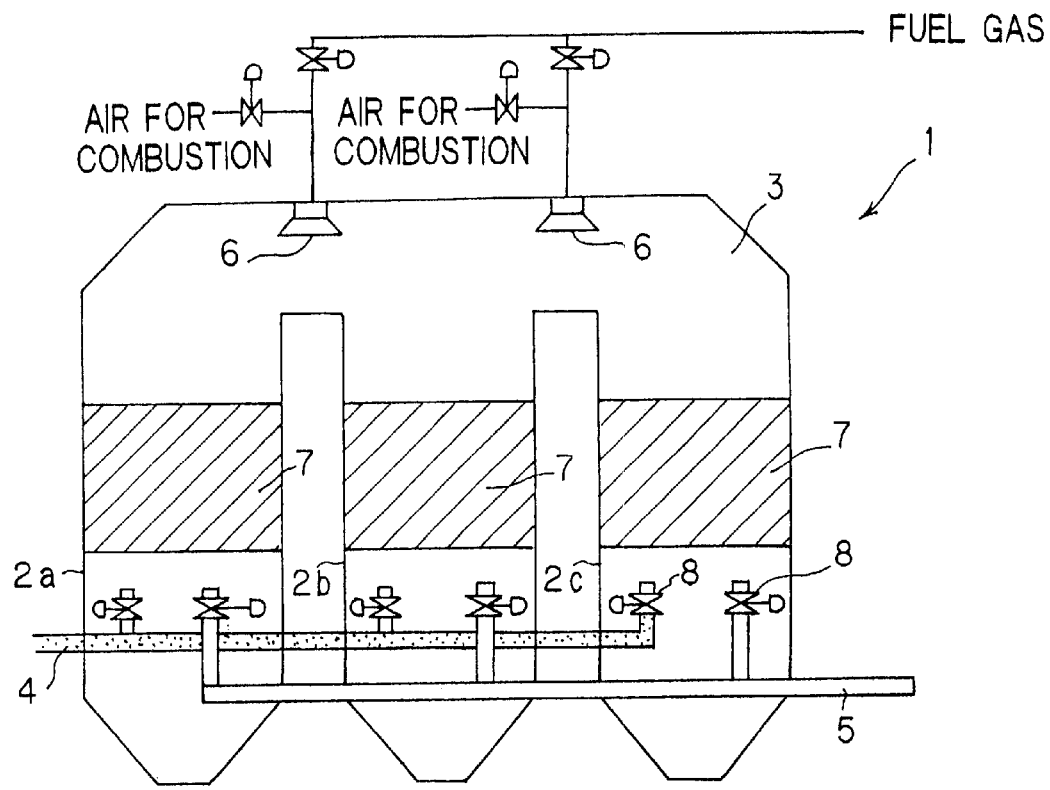
FIG. 1 is a schematic sectional view of a RTO.
Figure 2:
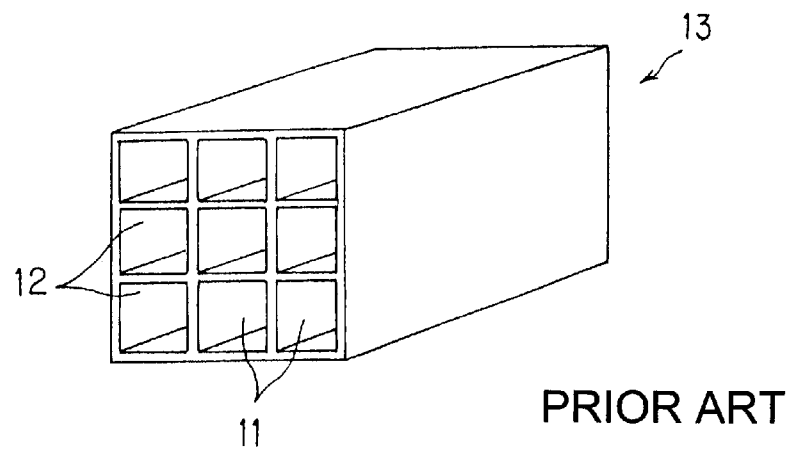
FIG. 2 is a perspective view of a honeycomb structure.

The ceramic honeycomb structure of the present invention has an open frontal area of 50 to 85% by weight, a porosity of 0.1 to 10% by weight; and a proportion of the volume of pores of 1 μm or larger in diameter, in total pore volume, of 20% by weight or more.

By allowing the present ceramic honeycomb structure to have an open frontal area of 50 to 85% by weight, the honeycomb structure can have a large surface area per unit volume and can have heat exchange property sufficient for use as a heat-accumulating unit of RTO or the like and moreover can have a mechanical strength required for the heat-accumulating unit. When the open frontal area is less than 50%, the pressure loss of honeycomb structure is high and the heat exchange property is insufficient. When the open frontal area is more than 85%, the mechanical strength of honeycomb structure is insufficient and the bulk specific gravity is small, resulting in insufficient heat accumulation capacity. Herein, the open frontal area is a value obtained by calculation of the following formula:

$$\{(p-d)^2/p^2\} \times 100$$

wherein p is the pitch of cell and d is the thickness of partition wall. The open frontal area is preferably 60 to 80% from the standpoint of production of the honeycomb structure.

The reason why the present ceramic honeycomb structure is allowed to have a porosity of 0.1% or more, is that a porosity less than 0.1% results in significantly low thermal shock resistance. A porosity of 10% or less is required to allow the honeycomb structure to have a large heat accumulation capacity and a large specific gravity (this can prevent floating of the honeycomb structure by gas pressure). Herein, "porosity" refers to a proportion (%) of total pore volume in honeycomb structure volume. The porosity is preferably 7.5% or less.

By allowing the present ceramic honeycomb structure to have a proportion of the volume of pores of 1 μm or larger in diameter, in total pore volume, of 20% or more, the honeycomb structure can have high thermal shock resistance and is resistant to rupture. Pores of large diameters can prevent the growth of cracking. When the proportion of the volume of pores of 1 μm or larger in diameter, in total pore volume is less than 20%, the honeycomb structure has low resistance to rupture when used as a heat accumulator or the like. By increasing the proportion of pores of relatively large diameter, it is possible to decrease the proportion of pores of small diameter in which adsorption of VOC takes place. Herein, "diameter of pore" and "proportion of the volume of particular pores in total pore volume" are values obtained by mercury porosimetry.

The ceramic honeycomb structure of the present invention preferably has a thermal expansion coefficient of $3.0 \times 10^{-8}$/° C. or less in the flow direction of cell. When the thermal expansion coefficient is more than $3.0 \times 10^{-8}$/° C., the honeycomb structure has insufficient thermal shock resistance and, when used as a heat-accumulating unit of RTO or the like, has a high possibility of rupture.

Further, the present ceramic honeycomb structure preferably has an average pore diameter of 0.01 μm or more. VOC, etc. are easily adsorbed inside pores of small diameter; therefore, when the average pore diameter of honeycomb structure is less than 0.01 μm, the proportion of pores of small diameter in which VOC, etc. are easily adsorbed, is large and release of pre-deodorization gas into air takes place in deodorization. Herein, "average pore diameter" is a value obtained by mercury porosimetry. The average pore diameter of the present ceramic honeycomb structure is more preferably 0.01 to 3 μm. An average pore diameter of 3 μm or less is preferred because, if the present honeycomb structure having a low porosity has an average porosity of more than 3 μm, the honeycomb structure may have large scattered pores, wherein cracking grows and thermal shock resistance is low.

Further, the ceramic honeycomb structure of the present invention preferably has a partition wall thickness of 100 to 800 μm. When the partition wall thickness is less than 100

μm, no sufficient mechanical strength is secured when the honeycomb structure is used as a heat accumulator or the like; when the partition wall thickness is more than 800 μm, small cell pitch and, accordingly, large GSA and large heat accumulation capacity are impossible. The partition wall thickness is more preferably 300 to 500 μm. In the ceramic honeycomb structure of the present invention, when the partition wall thickness is set at 100 to 800 μm, the porosity is preferably set at 7.5% or less. The reason is that by making small the porosity and suppressing the continuity of pores, reduction in mechanical strength of honeycomb structure due to small partition wall thickness can be prevented. A GSA of 0.8 mm$^2$/mm$^3$ or more is necessary for prevention of reduction in heat exchange property.

Further, in the present ceramic honeycomb structure, the main crystalline phase is preferably made of cordierite which is a material of low thermal expansion. Herein, "the main crystalline phase" refers to a crystalline phase having the largest volume, of all the crystalline phases present in the ceramic honeycomb structure.

The ceramic honeycomb structure of the present invention has a sufficient heat accumulation capacity; seldom shows adsorption of VOC or the like, or floating by gas pressure; is resistant to rupture; and has a large GSA. Therefore, the honeycomb structure can be suitably used as a heat-accumulating unit of RTO or RCO. The ceramic honeycomb structure of the present invention can also be used as a heat accumulator or the like in a state that a plurality of the honeycomb structures are connected with each other at their ends or contacted with each other at their sides.

The ceramic honeycomb structure of the present invention is produced by adding at least a molding aid and a solvent to a raw material mixture consisting of a ceramic material and a ceramic precursor material, kneading the resulting mixture to obtain a molding material, extruding the molding material into a honeycomb-shaped material, and drying and firing the honeycomb-shaped material.

In that case, the proportion of the ceramic material in the raw material mixture is 50 to 95% by weight. By allowing the proportion of the ceramic material to fall in this range, the contraction of honeycomb material during drying and firing steps can be made small; consequently, the defectives generated in drying and firing steps can be reduced and a honeycomb structure small in partition wall thickness and cell pitch can be produced easily. The proportion of the ceramic material in the raw material mixture is preferably 75 to 95% by weight from the standpoint of setting the porosity of honeycomb structure at 7.5% or less.

Herein, "ceramic material" refers to a material composed of a ceramic, and "ceramic precursor material" refers to a material converted into a ceramic when fired.

In the process of the present invention, the ceramic material and the ceramic precursor material have each an average particle diameter of 3 to 25 μm. By setting the average particle diameter in this range, the molding material has good moldability and a honeycomb structure low in porosity can be produced.

Also in the present process, the raw material mixture has an average particle diameter of 5 to 20 μm. Thereby, the proportion of the volume of pores of 1 μm or larger in diameter, in total pore volume can be made 20% or more.

In the present process, when the average particle diameter of the ceramic material is Da and the average particle diameter of the ceramic precursor material is Db, Da is in a range of 3 μm to less than 5 μm, and Da and Db satisfy Da≦0.6×Db, or Db is in a range of 3 μm to less than 5 μm, and Da and Db satisfy Db≦0.6×Da, or Da and Db are each in a range of 5 μm to 15 μm, or Da is in a range of 15 μm to less than 25 μm, and Da and Db satisfy 0.6×Da≧Db, or Db is in a range of 15 μm to less than 25 μm, and Da and Db satisfy 0.6×Db≧Da.

When the average particle diameter of either one of the ceramic material and the ceramic precursor material is 3 μm to less than 5 μm, the porosity of the honeycomb structure is low but there is a problem that the proportion of the volume of pores of 1 μm or larger in diameter, in total pore volume is low. This problem can be alleviated by controlling the average particle diameter of the other material so that the average particle diameter of the one material becomes 60% or less of the average particle diameter of the other material and appropriately controlling the particle-to-particle distance of the primary particles of the other material.

When the average particle diameter of either one of the ceramic material and the ceramic precursor material is 15 μm to less than 25 μm, the proportion of the volume of pores of 1 μm or larger in diameter, in total pore volume is high but there is a problem that the porosity of honeycomb structure is high. In this case, a low porosity is achieved by controlling the average particle diameter of the other material at 60% or less of the average particle diameter of the one material to make dense the honeycomb structure by utilizing the closest packing effect of particles.

In the process of the present invention, it is possible that each of the ceramic material and the ceramic precursor material consists of first particles having an average particle diameter of 15 μm to less than 25 μm and second particles having an average particle diameter of 60% or less of that of the first particles and that the proportion of the second particles in each material is 5% by weight to less than 50% by weight.

In the present process, when each material comprises two or more particle groups different in average particle diameter and the average particle diameter of the first particle group is 15 μm to less than 25 μm, the second particle group is allowed to have an average particle diameter of 60% or less of that of the first particle group, whereby the honeycomb structure can be made dense owing to the closest packing effect of particles as in the above case and can have a low porosity. The reason for that the proportion of the second particle group in each material is 5% by weight to less than 50% by weight, is from consideration of the closest packing effect as in the above case. The ceramic material or the ceramic precursor material may consist of one kind or a plurality of kinds.

In the process of the present invention, the particles of the ceramic precursor material may be coated with a molding aid or a solvent beforehand. By this coating, the resulting molding material has good moldability and a dense honeycomb structure is obtained easily.

In the present process, it is preferred to use a ceramic precursor material and a ceramic material obtained by firing the ceramic precursor material. By using a ceramic precursor material and a ceramic material obtained by firing the ceramic precursor material once, that is, by using the same starting substance for the ceramic precursor material and the ceramic material, as compared with when using different starting substances for the ceramic precursor material and the ceramic material, higher reactivity is obtained during firing and a honeycomb structure of higher density and lower porosity can be obtained. In this case, if the scraps generated during molding or after drying in the process for honeycomb structure production are utilized as a ceramic material or a ceramic precursor material, it contributes to effective use of industrial waste.

The present invention is described in more detail below by way of Examples. However, the present invention is not restricted to these Examples.

EXAMPLE 1

A ceramic honeycomb structure having an open frontal area of 65% was produced using a raw material mixture consisting of a ceramic material (cordierite) and a ceramic precursor material (a mixture of talc, kaolin and alumina). The ceramic honeycomb structure was measured for (1) porosity, (2) average pore diameter, (3) proportion of the volume of pores of 1 µm or larger in diameter, in total pore volume, (4) thermal expansion coefficient, (5) temperature resistant to thermal shock and (6) average heat exchange efficiency.

Production of the ceramic honeycomb structure was conducted as follows.

First, cordierite and the ceramic precursor material were mixed in proportions of 95 by weight and 5% by weight, respectively, to obtain a raw material mixture. Thereto were added a binder and a surfactant, and the resulting mixture was kneaded to obtain a molding material. The molding material was extruded into a honeycomb-shaped material. Then, the honeycomb-shaped material was dried and fired to produce a ceramic honeycomb structure.

The cordierite used as the ceramic material had an average particle diameter of 8 µm, and the ceramic precursor material had an average particle diameter of 10 µm. The raw material mixture had an average particle diameter of 8.1 µm. The ceramic precursor material was used by coating the particles with methyl cellulose (a molding aid). The dimension and shape of the ceramic honeycomb structure was a rectangular parallelepided having a square end of 150 mm×150 mm and a length of 150 mm. In the ceramic honeycomb structure, the thickness of partition wall was 430 µm and the pitch of cell was 2.5 mm.

The measurements for the ceramic honeycomb structure were conducted as follows. Porosity was measured by boiling method; average pore diameter and proportion of the volume of pores of 1 µm or larger in diameter, in total pore volume were measured by mercury porosity; and thermal expansion coefficient was measured by contact method. Temperature resistant to thermal shock and heat exchange efficiency were measured as follows.

Temperature Resistant to Thermal Shock:

A sample (a ceramic honeycomb structure) was heated and then cooled in an electric furnace; this heating and cooling cycle was repeated with the heating temperature increased by 50° C. when each new cycle began, until cracking appeared in the ceramic honeycomb structure. The heating temperature in the cycle right before cracking appeared, was taken as the temperature resistant to thermal shock, of the sample.

Heat Exchange Efficiency:

A sample (a ceramic honeycomb structure) was mounted on a RTO shown in FIG. 1, as a heat-accumulating unit, and deodorization was conducted. Gas temperatures were measured and a value calculated from the following formula was taken as the heat exchange efficiency of the sample.

$$\epsilon = (T_{c\ out} - T_{c\ in})/(T_{h\ in} - T_{c\ in})$$

wherein $T_{c\ out}$ is the temperature of pre-deodorization gas at the outlet of heat-accumulating unit; $T_{c\ in}$ is the temperature of pre-deodorization gas at the inlet of heat-accumulating unit; and $T_{h\ in}$ is the temperature of post-deodorization gas at the inlet of heat-accumulating unit.

The results are shown in Table 1.

EXAMPLES 2–12 AND 17

Ceramic honeycomb structures were produced in the same manner as in Example 1 except that the proportions of ceramic material and ceramic precursor material, the average particle diameters of ceramic material and ceramic precursor material, and the average particle diameter of raw material mixture were as shown in Table 1. Each ceramic honeycomb structure was measured for (1) porosity, (2) average pore diameter, (3) proportion of the volume of pores of 1 µm or larger in diameter, in the total pore volume, (4) thermal expansion coefficient, (5) is temperature resistant to thermal shock and (6) average heat exchange efficiency, in the same manner as in Example 1. The results are shown in Table 1.

EXAMPLES 13–16

Ceramic honeycomb structures were produced in the same manner as in Example 1 except that the ceramic material and the ceramic precursor material were each constituted by two particle groups different in average particle diameter and that the proportions of ceramic material and ceramic precursor material, the average particle diameters of ceramic material and ceramic precursor material, and the average particle diameter of raw material mixture were as shown in Table 1. Each ceramic honeycomb structure was measured for (1) porosity, (2) average pore diameter, (3) proportion of the volume of pores of 1 µm or larger in diameter, in total pore volume, (4) thermal expansion coefficient, (5) temperature resistant to thermal shock and (6) average heat exchange efficiency, in the same manner as in Example 1. The results are shown in Table 1.

COMPARATIVE EXAMPLES 1–4, 6 AND 8

Ceramic honeycomb structures were produced in the same manner as in Example 1 except that the proportions of ceramic material and ceramic precursor material, the average particle diameters of ceramic material and ceramic precursor material, the average particle diameter of raw material mixture, and the coating (made or not made) of particles with molding aid were as shown in Table 1. Each ceramic honeycomb structure was measured for (1) porosity, (2) average pore diameter, (3) proportion of the volume of pores of 1 µm or larger in diameter, in total pore volume, (4) thermal expansion coefficient, (5) temperature resistant to thermal shock and (6) average heat exchange efficiency, in the same manner as in Example 1. The results are shown in Table 1.

COMPARATIVE EXAMPLE 5

A ceramic honeycomb structure was produced in the same manner as in Example 1 except that the ceramic material and the ceramic precursor material were each constituted by two particle groups different in average particle diameter and that the proportions of ceramic material and ceramic precursor material, the average particle diameters of ceramic material and precursor material for ceramic, the average particle diameter of raw material mixture, and the coating (made or not made) of particles with molding aid were as shown in Table 1. The ceramic honeycomb structure was measured for (1) porosity, (2) average pore diameter, (3) proportion of the volume of pores of 1 µm or larger in diameter, in total pore volume, (4) thermal expansion coefficient, (5) temperature resistant to thermal shock and (6) average heat exchange efficiency, in the same manner as in Example 1. The results are shown in Table 1.

COMPARATIVE EXAMPLES 7 AND 9

Ceramic honeycomb structures were produced in the same manner as in Example 1 except that clay was used as the ceramic precursor material and that the proportions of ceramic material and ceramic precursor material, the average particle diameters of ceramic material and ceramic precursor material, and the average particle diameter of raw material mixture were as shown in Table 1. Each ceramic honeycomb structure was measured for (1) porosity, (2) average pore diameter, (3) proportion of the volume of pores of 1 μm or larger in diameter, in total pore volume, (4) thermal expansion coefficient, (5) temperature resistant to thermal shock and (6) average heat exchange efficiency, in the same manner as in Example 1. The results are shown in Table 1.

TABLE 1

| | Proportions in raw material mixture (wt. %) (average particle diameter (μm)) | | | | | Average particle diameter of raw material mixture (μm) | Coating of Particles with molding aid | Ceramic honeycomb structure | | | |
|---|---|---|---|---|---|---|---|---|---|---|---|
| | Ceramic material | | Ceramic precursor material | | | | | GSA (mm²/mm³) | Porosity (%) | Proportion of volume of particular pores in total pore volume (%) | pore diameter (μm) |
| | 1 | 2 | 1 | 2 | 3 | | | | | | |
| Example 1 | 95(8) | — | 5(10) | — | — | 8.1 | Made | 1.3 | 1.2 | 38 | 0.05 |
| Example 2 | 90(8) | — | 10(10) | — | — | 8.2 | Made | 1.3 | 2.9 | 57 | 0.08 |
| Example 3 | 80(8) | — | 20(10) | — | — | 8.4 | Made | 1.3 | 4.1 | 64 | 0.08 |
| Example 4 | 75(8) | — | 25(10) | — | — | 8.5 | Made | 1.3 | 5.8 | 65 | 0.08 |
| Example 5 | 70(8) | — | 30(10) | — | — | 8.6 | Made | 1.3 | 6.3 | 76 | 0.09 |
| Example 6 | 60(8) | — | 40(10) | — | — | 8.8 | Made | 1.3 | 7.6 | 82 | 0.15 |
| Example 7 | 50(8) | — | 50(10) | — | — | 9.0 | Made | 1.3 | 8.3 | 90 | 0.18 |
| Example 8 | 70(3) | — | 30(10) | — | — | 5.1 | Made | 1.3 | 5.3 | 48 | 0.07 |
| Example 9 | 70(5) | — | 30(10) | — | — | 6.5 | Made | 1.3 | 5.7 | 50 | 0.08 |
| Example 10 | 70(10) | — | 30(10) | — | — | 10 | Made | 1.3 | 8.1 | 78 | 0.09 |
| Example 11 | 70(20) | — | 30(10) | — | — | 17 | Made | 1.3 | 8.8 | 87 | 0.15 |
| Example 12 | 70(25) | — | 30(10) | — | — | 21 | Made | 1.3 | 9.6 | 92 | 0.13 |
| Example 13 | 55(18) | 5(10) | 35(18) | 5(10) | — | 17 | Made | 1.3 | 7.2 | 73 | 0.18 |
| Example 14 | 50(18) | 10(10) | 35(18) | 5(10) | — | 17 | Made | 1.3 | 6.5 | 61 | 0.12 |
| Example 15 | 45(18) | 15(10) | 35(18) | 5(10) | — | 16 | Made | 1.3 | 6.8 | 52 | 0.09 |
| Example 16 | 40(18) | 20(10) | 35(18) | 5(10) | — | 16 | Made | 1.3 | 8.1 | 41 | 0.19 |
| Example 17 | 70(8) | — | 30(10) | — | — | 8.6 | Made | 0.8 | 6.1 | 73 | 0.13 |
| Comparative Example 1 | 100(8) | — | 0(—) | — | — | 8 | Not made | 1.3 | 4.2 | 19 | 0.05 |
| Comparative Example 2 | 40(8) | — | 60(10) | — | — | 9.2 | Made | 1.3 | 11.2 | 93 | 0.37 |
| Comparative Example 3 | 70(15) | — | 30(10) | — | — | 14 | Made | 1.3 | 10.8 | 76 | 0.12 |
| Comparative Example 4 | 70(30) | — | 30(10) | — | — | 24 | Made | 1.3 | 12.5 | 96 | 0.21 |
| Comparative Example 5 | 35(18) | 25(10) | 35(18) | 5(10) | — | 16 | Made | 1.3 | 11.2 | 46 | 0.25 |
| Comparative Example 6 | 70(18) | — | 30(10) | — | — | 8.6 | Not made | 1.3 | 11.8 | 83 | 0.53 |
| Comparative Example 7 | 70(8) | — | 0(—) | — | 30(10) | 8.6 | Made | 1.3 | 0.8 | 88 | 0.42 |
| Comparative Example 8 | 70(8) | — | 30(10) | — | — | 8.6 | Made | 0.5 | 6.2 | 76 | 0.12 |
| Comparative Example 9 | 60(8) | — | 0(—) | — | 40(10) | 8.8 | Made | 0.8 | 0 | 0 | — |

| | Ceramic honeycomb structure | | | |
|---|---|---|---|---|
| | Thermal expansion coefficient (× 10⁻⁸/° C.) | Temperature resistant to thermal shock (° C.) | Average heat exchange efficiency (%) | Amount of VOC adsorbed (μg/g honeycomb) |
| Example 1 | 1.8 | 550 | 93 | 25 |
| Example 2 | 1.7 | 600 | 93 | 40 |
| Example 3 | 1.8 | 600 | 93 | 45 |
| Example 4 | 1.8 | 600 | 93 | 60 |
| Example 5 | 1.8 | 600 | 93 | 50 |
| Example 6 | 1.8 | 600 | 93 | 45 |
| Example 7 | 1.8 | 600 | 92 | 25 |
| Example 8 | 2.1 | 550 | 93 | 85 |
| Example 9 | 2.0 | 550 | 92 | 90 |
| Example 10 | 1.8 | 600 | 92 | 55 |
| Example 11 | 1.7 | 550 | 90 | 25 |
| Example 12 | 1.8 | 550 | 90 | 25 |
| Example 13 | 1.7 | 600 | 92 | 60 |
| Example 14 | 1.8 | 600 | 92 | 80 |
| Example 15 | 1.7 | 550 | 92 | 100 |
| Example 16 | 1.7 | 550 | 90 | 125 |
| Example 17 | 1.8 | 600 | 90 | 55 |
| Comparative Example 1 | 2.1 | 450 | 92 | 105 |
| Comparative Example 2 | 1.8 | 600 | 89 | 25 |
| Comparative Example 3 | 1.8 | 600 | 89 | 80 |

TABLE 1-continued

| | | | | |
|---|---|---|---|---|
| Comparative Example 4 | 1.8 | 550 | 88 | 30 |
| Comparative Example 5 | 1.8 | 550 | 89 | 130 |
| Comparative Example 6 | 1.8 | 550 | 88 | 65 |
| Comparative Example 7 | 4.0 | 400 | 90 | 5 |
| Comparative Example 8 | 1.8 | 600 | 88 | 50 |
| Comparative Example 9 | 6.2 | 300 | 89 | 0 |

As is clear from Table 1, the ceramic honeycomb structures of Examples were superior in temperature resistant to thermal shock and heat exchange efficiency, while the ceramic honeycomb structures of Comparative Examples were inferior in either of temperature resistant to thermal shock and heat exchange efficiency.

The ceramic honeycomb structure of the present invention has a small porosity and, therefore, has a sufficient heat accumulation capacity and hardly causes floating by gas pressure; has controlled pore diameters and, therefore, hardly gives rise to adsorption of VOC or the like, or rupture; and has controlled contraction and, therefore, has a large GSA. The present ceramic honeycomb structure can therefore be suitably used as a heat-accumulating unit of RTO or RCO.

What is claimed is:

1. A ceramic honeycomb structure having an open frontal area of 50% to 85%, a porosity of 0.1% to 7.5%, a proportion of the volume of pores of 1 $\mu$m or larger in diameter, in total pore volume, of 20% or more, and a partition was thickness of at least 300 $\mu$m.

2. A ceramic honeycomb structure according to claim 1, further having a thermal expansion coefficient of $3.0 \times 10^{-8}/°$C. or less in the flow direction of cell, an average pore diameter of 0.01 $\mu$m or more, a partition wall thickness of 300 $\mu$m to 800 $\mu$m, and a geometrical surface area of 0.8 mm$^2$/mm$^3$ or more.

3. A ceramic honeycomb structure according to claim 2, wherein the main crystalline phase is made of cordierite.

4. A regenerative thermal oxidizer comprising a plurality of ceramic honeycomb structures, each having an open frontal area of 50% to 85%, a porosity of 0.1% to 7.5%, a proportion of the volume of pores of 1 $\mu$m or larger in diameter, in total pore volume, of 20% or more, and a partition was thickness of at least 300 $\mu$m.

5. A regenerative catalystic oxidizer comprising a plurality of ceramic honeycomb structures, each having an open frontal area of 50% to 85%, a porosity of 0.1% to 7.5%, a proportion of the volume of pores of 1 $\mu$m or larger in diameter, in total pore volume, of 20% or more and a partition wall thickness of at least 300 $\mu$m.

6. A process for producing a ceramic honeycomb structure of claim 1, which comprises adding at least a molding aid and a solvent to a raw material mixture comprising a ceramic material and a ceramic precursor material, kneading the resulting mixture to obtain a molding material, extruding the molding material into a honeycomb-shaped material, and drying and firing the honeycomb-shaped material, wherein the proportion of the ceramic material in the raw material mixture is 50 to 95% by weight, the average particle diameters of the ceramic material and the ceramic precursor material are each in a range of 3 to 25 $\mu$m, the average particle diameter of the raw material mixture is in a range of 5 to 20 $\mu$m, and when the average particle diameter of the ceramic material is Da and the average particle diameter of the ceramic precursor material is Db, Da is in a range of 3 $\mu$m to less than 5 $\mu$m, and Da and Db satisfy Da$\leq$0.6$\times$Db, or Db is in a range of 3 $\mu$m to less than 5 $\mu$m, and Da and Db satisfy Db$\leq$0.6$\times$Da, or Da and Db are each in a range of 5 $\mu$m to 15 $\mu$m, or Da is in a range of 15 $\mu$m to less than 25 $\mu$m, and Da and Db satisfy 0.6$\times$Da$\geq$Db, or Db is in a range of 15 $\mu$m to less than 25 $\mu$m, and Da and Db satisfy 0.6$\times$Db$\geq$Da.

7. A process for producing a ceramic honeycomb structure according to claim 6, wherein the proportion of the ceramic material in the raw material mixture is 75 to 95% by weight.

8. A process for producing a ceramic honeycomb structure according to claim 6, wherein each of the ceramic material and the ceramic precursor material consists of first particles having an average particle diameter of 15 $\mu$m to less than 25 $\mu$m and second particles having an average particle diameter of 60% or less of that of the first particles, and the proportion of the second particles in each material is 5% by weight to less than 50% by weight.

9. A process for producing a ceramic honeycomb structure according to claim 6, wherein at least part of the surfaces of the particles constituting the ceramic precursor material is coated with a molding aid or a solvent.

10. A process for producing a ceramic honeycomb structure according to claim 6, wherein the ceramic material is a material obtained by firing the ceramic precursor material.

11. A process for producing a ceramic honeycomb structure according to claim 10, wherein the main crystalline phase of the ceramic material is made of cordierite.

12. A ceramic honeycomb structure according to claim 1, wherein the partition wall thickness is from 300 to 800 $\mu$m.

13. A regenerative thermal oxidizer according to claim 4, wherein the partition wall thickness is from 300 to 800 $\mu$m.

14. A regenerative catalytic oxidizer according to claim 5, wherein the partition wall thickness is from 300 to 800 $\mu$m.

* * * * *